April 21, 1925. 1,534,833
H. D. BINKS
LIQUID AND AIR SEPARATOR
Filed Nov. 10, 1924
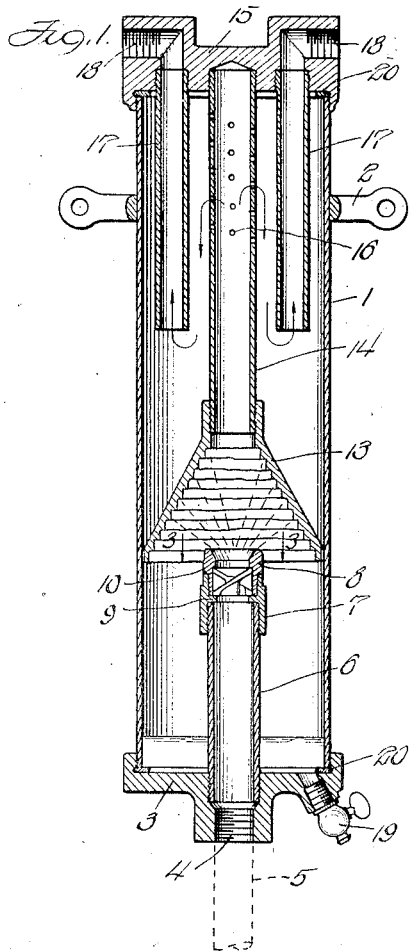
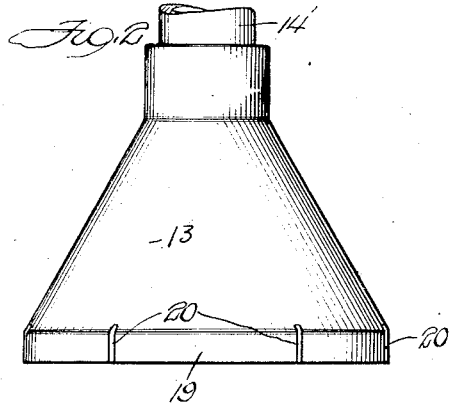
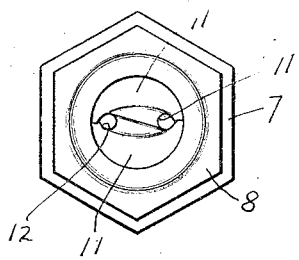
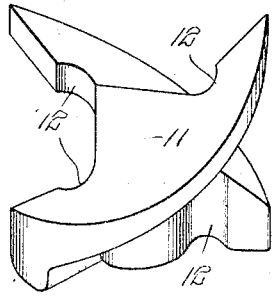
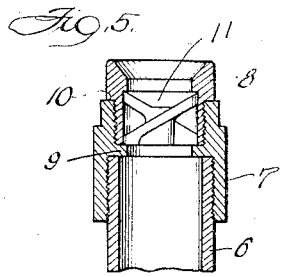
Inventor:
Harry D. Binks
by Albert Scheible
Attorney Patented Apr. 21, 1925.

1,534,833

UNITED STATES PATENT OFFICE.

HARRY D. BINKS, OF OAK PARK, ILLINOIS, ASSIGNOR TO BINKS SPRAY EQUIPMENT CO., OF CHICAGO, ILLINOIS, A CORPORATION OF ILLINOIS.

LIQUID AND AIR SEPARATOR.

Application filed November 10, 1924. Serial No. 748,875.

*To all whom it may concern:*

Be it known that I, HARRY D. BINKS, citizen of the United States, residing at Oak Park, in the county of Cook and State of Illinois, have invented certain new and useful Improvements in a Liquid and Air Separator; and I do hereby declare the following to be a full, clear, and exact description of the invention, such as will enable others skilled in the art to which it appertains to make and use the same.

My invention relates to means for effectively separating liquids from gases, and more particularly to a separator which will operate effectively for this purpose without requiring moving parts of any kind.

In coating surfaces with paints, enamels, varnishes or the like, it has become quite customary to apply the coating material in the form of a spray produced by the action of compressed air on the liquid when both are projected through a suitably constructed nozzle or spray-head. Owing to the necessity of lubricating the needed air compressor, oil is apt to work past the piston of the compressor so as to become intermingled with the air. Likewise, under certain atmospheric and temperature conditions, moisture in the air is apt to condense in the apparatus, thereby forming particles of water which are projected with the sprayed paint or other liquid. As the result, imperfections in the coating are produced wherever such particles of oil or water are intermixed with the sprayed liquid, this being due partly to an inadequate and irregular drying of the sprayed liquid and partly to a lack of its direct adhesion to the surface upon which it was sprayed.

In one of its immediate commercial aspects, my invention is particularly suitable for the separation of both oil and water from compressed air to overcome such difficulties. For this purpose, my invention aims to provide a simple, inexpensive and easily cleaned apparatus in which the needed separation is effected by movements imparted through the pressure of the compressed air, and particularly to provide an apparatus in which the separation of the liquids from the air is effected by a centrifugal action without requiring the use of any moving parts.

Furthermore, my invention provides a separator designed so that any liquids intermingled with the air or other gas will be projected against suitable baffles and in which these baffles are disposed so that the liquid caught by the same will drip out of the path of the moving gas from which they have been separated. My invention also provides simple and effective means for entrapping any liquid particles which may pass uncaught beyond the baffles and for feeding these liquid particles also to the caught-liquid or sediment chamber of the appliance, and provides simple means for draining off the separated liquid. Moreover, my invention provides an appliance of this class in a compact construction which can readily be taken apart to clean all of its portions and which can easily be fastened to any suitable support. Still further and also more detailed objects will appear from the following specification and from the accompanying drawings, in which—

Fig. 1 is a central and vertical section through a separator embodying my invention.

Fig. 2 is an enlarged elevation of the baffle of this appliance and of a portion of the gas duct by which it is supported.

Fig. 3 is an enlarged plan view of the spray nozzle by means of which the liquid particles are projected in a hollow spray against the baffle.

Fig. 4 is an enlarged view of the core of this nozzle.

Fig. 5 is an enlargement of a portion of Fig. 1, namely of the complete spray nozzle and of a part of the inlet pipe which supports this nozzle.

In the embodiment of the drawings, the gas and liquid separator of my invention comprises an upright cylindrical casing 1 fastened to a clamp-strap 2 by means of which it can readily be secured to a wall or other suitable support. Threaded on the lower end of this casing is a bottom head 3 which has a central threaded bore 4 for attaching it to an inlet pipe 5 through which the liquid-carrying air or other gas is fed into the appliance.

This inlet 4 is in vertical alinement with an upright pipe 6 carrying a spray-head or nozzle designed for upwardly projecting a hollow conical spray. For this purpose, I am here showing the upper end of the pipe 6 as connected by a nipple 7 to an upwardly open nozzle outlet 8, the nipple 7 and the said outlet having opposed flanges 9 and 10 between which a nozzle core 11 is clamped. This nozzle core is here illustrated as of the type employed in the nozzle of my U. S. Patent No. 1,282,175 of October 22, 1918, namely one having a pair of spiral vanes each extending substantially half way around the axis of the nozzle and each having a pair of longitudinal recesses 12 in the diametric edges of the vane so as to permit some of the liquid to pass longitudinally of the nozzle core through these recesses while the greater portion of the fluid has a spirally advancing motion imparted to it by the rear (or in this case the lower) face of the spiral vanes 11. Owing to the action of the spirally advancing and of the longitudinally projected portions of the fluid upon each other, and owing likewise to the impinging of the issuing fluid on the wall of the nozzle outlet ahead of this core, a liquid if forcibly projected through such a nozzle will be subdivided into a conical spray.

If the nozzle casing had its outlet relatively small and at a considerable distance from such a core, as in the construction shown in my said U. S. patent, the resulting spray of a liquid would be in the form of a solid cone. However, in the present instance, I dispose the outlet of the nozzle close to the front end of the nozzle core and provide this outlet with a bore initially approximating the diameter of the nozzle core and then flaring forwardly. By so doing, I prevent an axial concentration of the projected fluid and produce a hollow conical spray of considerable divergence.

Mounted in the path of this diverging spray is a baffle member, here shown as consisting of an inverted funnel having its downwardly flaring interior formed into a series of steps, which steps act as baffles for catching any particles of liquid projected against them. This baffle member is desirably supported by a gas duct 14 from a head 15 threaded upon the upper end of the casing 1, the duct 14 having a considerable number of relatively small apertures 16 through which the air or other gas will pass out of this pipe into the interior of the casing. The head 14 also carries at least one gas outlet pipe 17 leading to a suitable outlet 18 for the exit of the air or other gas from which the liquid has been extracted. In the present instance, two such fluid outlets and gas outlet pipes are shown, it being customary to employ a single compressed air apparatus for supplying air to a number of liquid spraying appliances which can then be connected to one and the same separator. In each case, the outlet pipe 17 preferably depends for a considerable distance below the lowest of the apertures 16, so as to prevent any particles of liquids which were not caught by the baffle 13 from being projected through the apertures 16 into the outlet pipe 17.

To prevent liquid particles of the spray after being caught on the baffle from crawling up along the interior of the casing, I preferably form the lower end of the funnel-shaped baffle member with a depending flange 19 closely fitting the bore of the casing 1, so that this baffle member divides the casing into upper and lower compartments. However, I also provide this baffle member with a number of relatively small vertical slots 20 through which any liquid caught in the upper compartment of the casing can trickle down past the baffle member into the lower compartment of the casing.

When the apparatus as thus arranged is connected through a pipe 5 to a source of compressed air, the action of the spray nozzle causes this air to issue vertically from the nozzle outlet 8 in the form of a hollow conical spray. In affording this action, the centrifugal action within the nozzle will be particularly effective as to any heavier particles, such as liquid particles, which may be intermixed with the air. Hence these particles will be thrown out at considerable distances from the axis of the nozzle, so that practically all of them will impinge upon the annular steps provided on the lower surface of the baffle member. In practice, these stepped interior portions of the baffle member are preferably roughened surfaces, so as to increase the readiness with which even quite finely divided particles of liquid will be caught on them. These particles then either fall directly by gravity into the bottom of the casing or trickle down along the stepped surfaces of the baffle member, so that in each case the liquid gradually accumulates in the bottom of the casing, from which it can be withdrawn by opening a drain cock 19.

Owing to the production of a hollow conical spray of a considerable angle of divergence, almost all of the liquids intermingled with the air or other gas are readily caught by the baffle member in this manner. Should any still be carried up with the upwardly moving current of air into the duct 14, these will be blown out through the outlets 16 and will be projected either against the interior of the casing 1 or against the lateral surfaces of the outlet pipe 17, so that these liquid particles will either trickle down the interior of the upper part of the casing or will fall down upon the flaring upper surface of the baffle 13. In either case, these particles of liquid will then trickle through the slots 20 into the lower compartment of the casing. When thus supplementing the action of the nozzle and of the baffle member by the above described auxiliary arrangement, I have found that I can secure a practically complete separation of air from oil and water even if the air initially had a quite large quantity of liquid intermingled with it.

To increase the liquid-catching and liquid feeding action of the baffle member, I desirably dispose this so that its mouth portion houses the outlet of the nozzle. I also desirably support both the baffle and the outlet pipe 17 from the head of the casing, so that these can be removed from the casing simultaneously by merely unscrewing the upper head 15, thereby affording instant access to the interior of the casing. Likewise, by unscrewing the bottom, the entire casing can be entirely detached if desired, an adequate sealing of the appliance being readily secured by interposing packing rings 20 between the ends of the casing and the two heads.

However, while I have illustrated and described my invention in an embodiment including various highly desirable features of construction and arrangement, I do not wish to be limited to the details thus disclosed, it being obvious that these might be modified in many ways without departing either from the spirit of my invention or from the appended claims. Neither do I wish to be limited to the use of my separator for the extraction of oil and water from compressed air, since it would obviously be equally serviceable for the separation of other liquids (or even of relatively fine solid particles) from gases of any kind.

I claim as my invention:—

1. A liquid and gas separator comprising means for projecting the mixture of liquid and gas in a hollow conical spray, and liquid catching means including a baffle member of a substantially conical formation coaxial with the said spray and disposed in the path of the spray, the said member having a gas outlet axial thereof.

2. A liquid and gas separator comprising means for projecting the mixture of liquid and gas in an upwardly directed hollow conical spray, a plurality of annular baffles coaxial with the said spray and disposed in substantially frusto-conical formation flaring toward the spray projecting means, and a gas outlet leading upwardly from the smaller end of the said baffle formation.

3. A liquid and gas separator comprising means for projecting the mixture of liquid and gas in a hollow conical spray, and liquid catching means including a baffle member of a substantially frusto-conical formation coaxial with the said spray and disposed in the path of the spray, the said member having a gas outlet axial thereof and having annular step-like baffle formations facing the spray.

4. Means for separating liquid from a gas, comprising an upright spray nozzle formed for projecting the mixture of gas and liquid in a hollow conical spray, a gas duct coaxial with the nozzle and having its inlet above the mouth of the nozzle, and baffle elements extending downwardly from the said inlet in a substantially inverted funnel-shaped formation across the path toward which the nozzle directs the hollow conical spray.

5. Means for separating liquid from a gas, comprising an upright spray nozzle formed for projecting the mixture of gas and liquid in a hollow conical spray, a gas duct coaxial with the nozzle and having its inlet above the mouth of the nozzle, and baffle elements extending downwardly from the said inlet in a substantially inverted funnel-shaped formation across the path toward which the nozzle directs the hollow spray, the baffle elements constituting a single member supported by the gas duct.

6. Means for separating liquid from compressed gas, comprising an upright casing, an inlet pipe extending upwardly into the casing, a spray nozzle at the upper end of the inlet pipe and formed for projecting a hollow conical spray, and a baffle member disposed in the path of the said spray, the baffle member forming a partition dividing the casing into a lower liquid-collecting compartment and an upper gas-outlet compartment.

7. In a liquid and gas separator, a casing, a partitioning member dividing the casing into upper and lower compartments, an inlet pipe extending into the lower compartment, an upwardly directed spray nozzle connected to the inner end of inlet pipe, baffles in the lower compartment above the nozzle and in the path of the spray projected through the latter, and a duct leading upwardly from above the spray nozzle and opening into the upper compartment of the casing.

8. In a liquid and gas separator, a casing, a partitioning member dividing the casing into upper and lower compartments, an inlet pipe extending into the lower compartment, an upwardly directed spray nozzle connected to the inner end of inlet pipe, baffles in the lower compartment above the nozzle and in the path of the spray projected through the latter, and a duct leading upwardly from above the spray nozzle and opening into the upper compartment of the casing, the partitioning member having relatively small passages connecting the two compartments.

9. A liquid and gas separator, comprising means for projecting the mixture of gas and liquid upwardly in a hollow conical spray formation, hollow baffle means disposed across the path of the said spray formation at a distance from the projecting means and adapted for catching the liquid constituents of the spray formation. means below the baffle means for receiving the caught liquid, and a gas duct leading upward from the upper end of the baffle means.

10. A liquid and gas separator, comprising means for projecting the mixture of gas and liquid upwardly in a hollow conical spray formation, hollow baffle means disposed across the path of the said spray formation at a distance from the projecting means and adapted for catching the liquid constituents of the spray formation, means below the baffle means for receiving the caught liquid, and a gas duct leading upward from the upper end of the baffle means.

11. An appliance for separating a liquid from a gas, comprising a casing, a partitioning member dividing the casing into upper and lower compartments and having an aperture therein, means in the lower compartment for projecting in the mixture of liquid and gas upwardly in the form of a whirling spray toward the partitioning member, baffle elements in the lower compartment in the path of the said spray, a gas duct leading upward from the said aperture and having its bore connected to the upper compartment, the casing having its upper compartment provided with a gas outlet.

12. An appliance for separating a liquid from a gas, comprising a casing, a partitioning member dividing the casing into upper and lower compartments and having an aperture therein, means in the lower compartment for projecting in the mixture of liquid and gas upwardly in the form of a whirling spray toward the partitioning member, baffle elements in the lower compartment in the path of the said spray, a gas duct leading upward from the said aperture and having its bore connected to the upper compartment, the casing having its upper compartment provided with a gas outlet and the partitioning member having relatively small passages connecting the upper and lower compartments.

13. A gas and liquid separator as per claim 12, in which the partitioning member has its upper surface sloping toward the said passages.

14. A gas and liquid separator as per claim 12, in which the partitioning member has its top flaring downwardly and in which the said passages comprise recesses formed in the outer edge of the partitioning member.

15. An appliance for separating a liquid from a gas, comprising a casing, a partitioning member dividing the casing into upper and lower compartments and having an aperture therein, means in the lower compartment for projecting in the mixture of liquid and gas upwardly in the form of a whirling spray toward the partitioning member, baffle elements in the lower compartment in the path of the said spray, a gas duct leading upward from the said aperture and having relatively small lateral apertures, and a gas outlet duct extending downwardly into the upper compartment.

16. In a gas and liquid separator, a casing, means for projecting the mixture of gas and liquid upwardly within the casing in a hollow conical spray, and a combined baffle and partitioning member disposed within the casing in the path of the said spray, the said member being of an inverted funnel shape and having annular and roughened steps on its lower face and having its outer edge fitting the bore of the casing.

17. In a gas and liquid separator, a casing, means for projecting the mixture of gas and liquid upwardly within the casing in a hollow conical spray, and a combined baffle and partitioning member disposed within the casing in the path of the said spray, the said member being of an inverted funnel shape and having annular and roughened steps on its lower face and having its outer edge fitting the bore of the casing, the said outer edge being provided with a passage connecting the portions of the casing above and below the partitioning member.

Signed at Chicago, Illinois, November 3, 1924.

HARRY D. BINKS.